US010400907B2

(12) United States Patent
Geva et al.

(10) Patent No.: US 10,400,907 B2
(45) Date of Patent: Sep. 3, 2019

(54) LEADING THREAD VALVE

(71) Applicants: LIFE ASSISTANT LTD., Afula (IL);
Iftah Geva, Kibbutz Reshafim (IL);
Gal Goldner, Kibbutz Ginegar (IL)

(72) Inventors: Iftah Geva, Kibbutz Reshafim (IL);
Gal Goldner, Kibbutz Ginegar (IL)

(73) Assignee: Life Assistant, LTD., Afula (IL)

( * ) Notice: Subject to any disclaimer, the term of this patent is extended or adjusted under 35 U.S.C. 154(b) by 0 days.

(21) Appl. No.: 15/775,412

(22) PCT Filed: Nov. 6, 2016

(86) PCT No.: PCT/IL2016/051198
§ 371 (c)(1),
(2) Date: May 11, 2018

(87) PCT Pub. No.: WO2017/081674
PCT Pub. Date: May 18, 2017

(65) Prior Publication Data
US 2018/0355992 A1    Dec. 13, 2018

Related U.S. Application Data

(60) Provisional application No. 62/254,207, filed on Nov. 12, 2015.

(51) Int. Cl.
*F16K 31/04*    (2006.01)
*F16K 31/50*    (2006.01)
*F16H 25/20*    (2006.01)

(52) U.S. Cl.
CPC ....... *F16K 31/047* (2013.01); *F16H 25/2015* (2013.01); *F16K 31/04* (2013.01); *F16K 31/50* (2013.01); *F16K 31/508* (2013.01)

(58) Field of Classification Search
CPC ........ F16K 31/047; F16K 31/50; F16K 31/04; F16K 31/508; F16H 25/2015
(Continued)

(56) References Cited

U.S. PATENT DOCUMENTS 3,700,085 A    10/1972   Balz et al.
3,856,043 A    12/1974   Feild et al.
(Continued)

FOREIGN PATENT DOCUMENTS

CN    202252241 U    5/2012
CN    203614865 U    5/2014
(Continued)

OTHER PUBLICATIONS

International Search Report (ISR) in PCT/IL2016/051198.
Written Opinion of International Search Authority PCT/IL2016/051198.

*Primary Examiner* — John Bastianelli
(74) *Attorney, Agent, or Firm* — Ted Whitlock

(57) ABSTRACT

An electric valve including, housed within a valve body, a nut having a central shaft; a screw threadingly engaged within the nut and fixed thereto to prevent the nut from turning around the screw; and a seal mounted to the central shaft and configured to move freely with respect to the central shaft, both axially and rotatably there-about. The valve further includes sliding bearings disposed between the nut and the seal and disposed between the nut and a base of the screw; a lip correspondingly disposed with respect to the seal and reversibly engagable therewith. A projection is attached at a periphery of the nut; and a limiter is positioned in an inner side of the valve body, configured so that the projection is abuttable therewith. Due to the slide bearings, neither during opening of the valve or closing of the valve does the seal slide on the lip.

9 Claims, 14 Drawing Sheets

(58) Field of Classification Search
USPC .................. 251/129.2, 84, 88, 266–272, 251/129.11–129.12
See application file for complete search history.

(56) References Cited

U.S. PATENT DOCUMENTS

| | | | |
|---|---|---|---|
| 4,235,258 A | 11/1980 | Uno et al. | |
| 4,346,728 A * | 8/1982 | Sulzer | F16K 29/00 137/243.6 |
| 4,723,754 A * | 2/1988 | Torimoto | F16K 31/04 251/129.05 |
| 4,789,132 A * | 12/1988 | Fujita | F16K 1/12 137/219 |
| 4,815,699 A * | 3/1989 | Mueller | F16K 41/10 251/129.11 |
| 5,060,910 A * | 10/1991 | Iwata | F16K 31/04 251/129.05 |
| 5,620,166 A * | 4/1997 | Lord | F16K 31/04 251/129.12 |
| 6,460,567 B1 * | 10/2002 | Hansen, III | F16K 31/04 137/554 |
| 6,561,480 B1 * | 5/2003 | Komiya | F16K 1/38 251/122 |
| 2005/0145810 A1 * | 7/2005 | Yonezawa | F16K 31/047 251/129.11 |
| 2008/0121833 A1 | 5/2008 | Weldon et al. | |
| 2011/0012038 A1 | 1/2011 | Lv et al. | |
| 2012/0318082 A1 | 12/2012 | Wasser | |

FOREIGN PATENT DOCUMENTS

| | | |
|---|---|---|
| FR | 1502695 A | 11/1967 |
| WO | 2001001027 A | 4/2001 |
| WO | 2011059678 A | 5/2011 |

* cited by examiner

LEADING THREAD VALVE

FIELD OF THE INVENTION

The present invention relates to the field of electrical valves, more specifically electrical valves that are operated by a rotatable thread, and more particularly that enable load-free rotation starting of the thread.

BACKGROUND OF THE INVENTION

Electrically operable valves typically include an electric motor that drives a screw via a gear, usually a reducing gear. In some cases, the electric motor drives the screw directly, without the presence of a gear. The screw is threadingly engaged within a nut that is fixed, i.e. prevented from turning around the screw. Therefore, turning the screw moves the nut. When the nut reaches the end of the valve closing (forward) stroke, the nut presses a valve seal, typically made of silicon, against a lip of a valve body, thereby closing the valve.

However, when the seal is pressed against the lip, the electric motor may not have enough force to release the seal from the valve body lip. One solution to this problem is to increase the power of the electric motor. However, such a motor is more expensive; consumes more power; and typically has larger dimensions, whereby the valve would be larger.

It is the object of the present invention to provide a valve that significantly reduces or overcomes the aforementioned disadvantages. It is a further object of the present invention to provide a valve that enables load-free rotation starting of the thread in both directions, i.e., in a closing direction and in an opening direction.

SUMMARY OF THE INVENTION

In accordance with embodiments of one aspect of the present invention there is provided an electric valve with a valve body. The valve body houses a nut having a central shaft; a screw threadingly engaged within the nut and fixed to the nut thereby preventing the nut from turning around the screw; and a seal mounted to the central shaft and configured to move freely with respect to the central shaft, both axially and rotatably there-about. The valve further includes sliding bearings disposed between the nut and the seal and disposed between the nut and a base of the screw; a lip correspondingly disposed with respect to the seal and reversibly engagable therewith. A projection is attached at a periphery of the nut; and a limiter is positioned in an inner side of the valve body, configured so that the projection is abuttable therewith. Due to the slide bearings, neither during opening of the valve or closing of the valve does the seal slide on the lip.

BRIEF DESCRIPTION OF THE DRAWINGS

For a better understanding of the present invention and to show how the same may be carried out in practice, reference will now be made to the accompanying drawings, in which.

DESCRIPTION OF PREFERRED EMBODIMENTS

Figure 1:
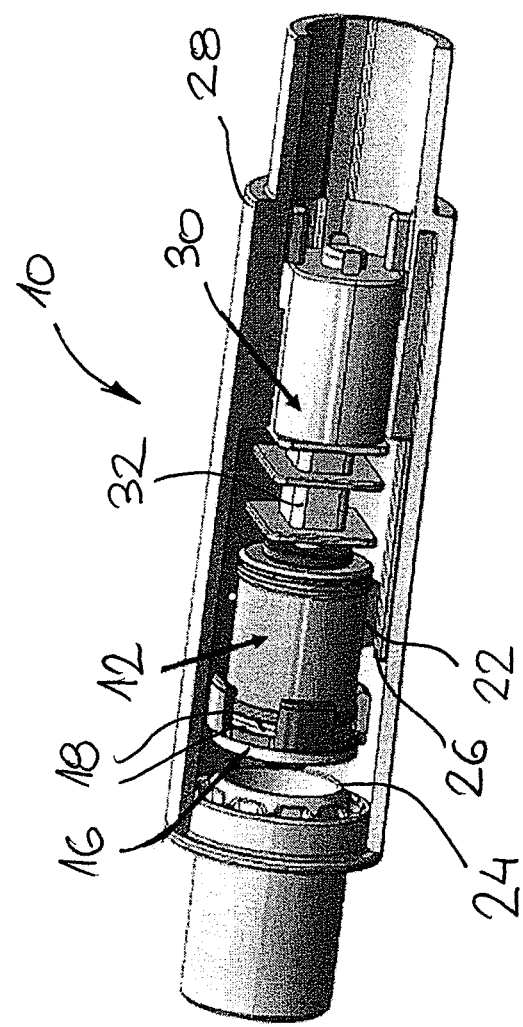
FIG. 1 is a perspective view of an embodiment of a valve according to the present invention in an open position.

FIGS. 1-14 show a valve 10 according to the present invention in various stages where the valve is closed, closing, opening and open. The valve 10 includes a nut 12 having a central shaft 14 on which a seal 16 is mounted. Seal 16 may freely move with respect to central shaft 14, both axially and rotatably around the central shaft.

It should be noted that directional terms appearing throughout the specification and claims, e.g. "forward", "rear", "upper", "lower" etc., are used as terms of convenience to distinguish the location of various surfaces relative to each other. These terms are defined with reference to the figures, however, they are used for illustrative purposes only, and are not intended to limit the scope of the invention.

Slide bearings 18 are disposed between nut 12 and seal 16. Sliding bearings 18 are typically two or more rings made of a material with a low coefficient of friction (or coated with same) and the rings also may freely move axially and rotate with respect to central shaft 14.

Nut 12 has one or two projections 22 attached at a periphery thereof. Sliding bearings 18 are also installed between nut 12 and a base of a screw 20, having a screw axis A, in the same manner as the sliding bearings 18 between the nut 12 and the seal 16.

To open the valve 10, the screw axis A turns to the right, i.e., in a clockwise direction CD as seen in the figures. At this stage, nut 12 moves together with the screw 20, i.e., there is no respective movement between the nut 12 and the screw 20, and, therefore, there is no friction force acting therebetween. Due to sliding bearings 18, nut 12 may turn while seal 16 remains pressed against a lip 24 of the valve 10, without any relative movement therebetween.

After about half a turn, during which nut 12 has acquired momentum, the projections 22 at the perimeter of the nut 12 reach and abut against a limiter 26 that is positioned in the inner side of a valve body 28 of the valve 10. After abutting the limiter 26, the nut 12 cannot continue turning, and, therefore, the nut starts a rearward axial movement, i.e., in a direction of valve opening, with respect to the screw 20.

At this stage, nut 12 has acquired momentum, together with the momentum of the electric motor 30 and a gear 32, therefore the rearward axial movement is easily carried out.

Seal 16 also obtains axial movement and easily disconnects from lip 24, since there is no frictional force therebetween due to the fact that seal 16 does not slide on lip 24 during turning at any stage of the process.

At the end of the opening process of valve 10, when nut 12 moves a full stroke rearwardly, the end of the opening process may be accomplished in one of two ways: (a) nut 12 slides at its rear portion against sliding bearings 18 between the nut 12 and a base of the screw 20; or (b) a forward portion of the screw 20 is pointed and it touches against an inward portion of nut 12, without almost any friction, due to the sharp edge of the screw 20.

To close the valve 10, screw axis A turns to the left, i.e., in a counterclockwise direction CCD as seen in the figures. At this stage, nut 12 moves together with screw 20, i.e., there is no relative movement therebetween, and therefore there is no friction force acting therebetween.

After about half a turn, during which nut 12 has acquired momentum, the projections 22 at the perimeter of nut 12 abut the limiter 26 at the inward portion of body 28 of valve 10. After abutting the limiter 26, nut 12 cannot continue to turn, and, therefore, the nut begins a forward axial movement relative to screw 20 in a closing direction of valve 10.

At this stage, nut 12 has already acquired momentum, together with the momentum of the electric motor 30 and the gear 32, therefore its forward axial movement is easily accomplished. At the end of the closing stroke of valve 10, with the fast forward movement of nut 12, seal 16 moves axially against lip 24 without any relative movement therebetween, i.e., without friction or wear. In the continuation of the forward movement of nut 12, the nut axially presses on seal 16 through sliding bearings 18, thereby obtaining a full and strong sealing of seal 16 against lip 24.

Accordingly, valve 10 provides various advantages, including: (a) allowing use of a relatively small electric motor; (b) energy saving; (c) fast valve action; (d) a large number of operations without or with limited friction, wear or faults; (e) simple construction, preventing the need of limit switches for controlling opening and closing of the valve 10, and (f) a relatively large cross-section for fluid flow can be obtained with a relatively small-sized valve.

Figure 2:
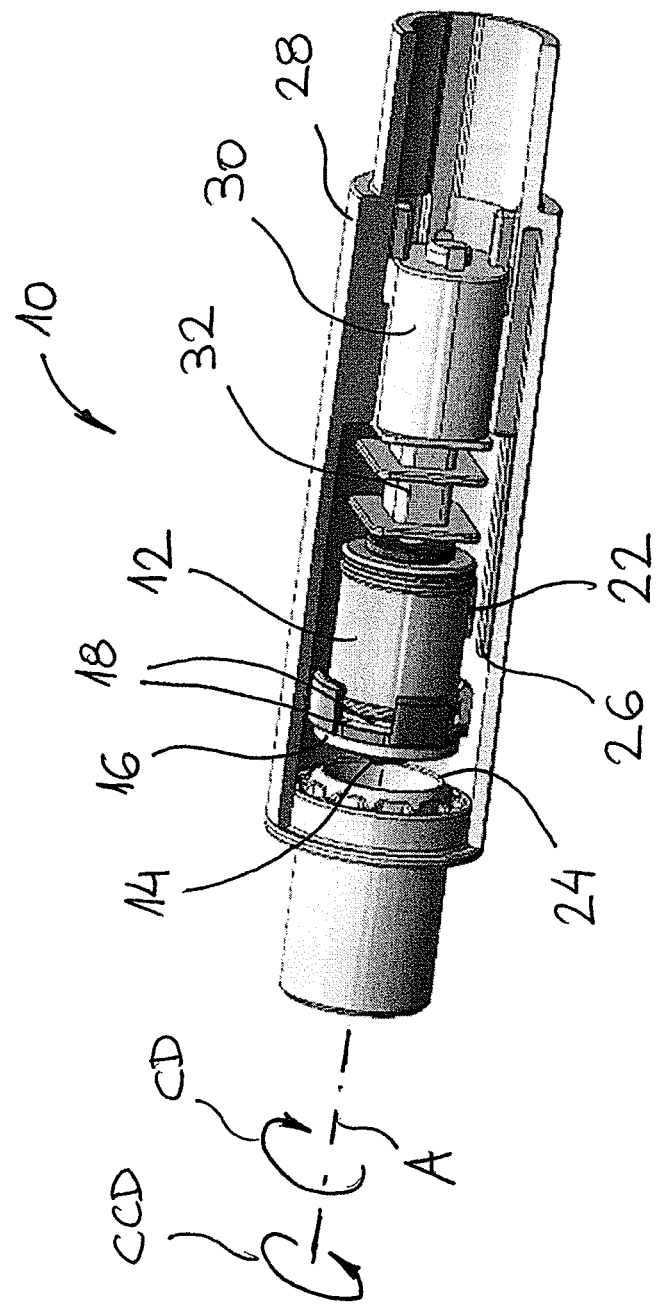
FIGS. 2-7 are perspective views of the valve of FIG. 1 showing the valve in various stages of closing.
Figure 3:
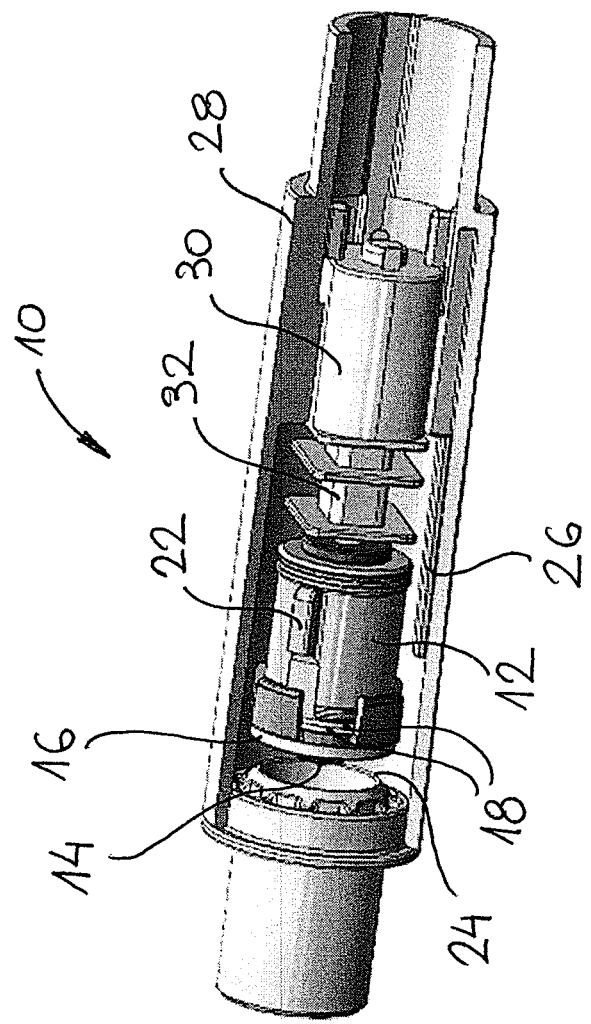
Figure 4:
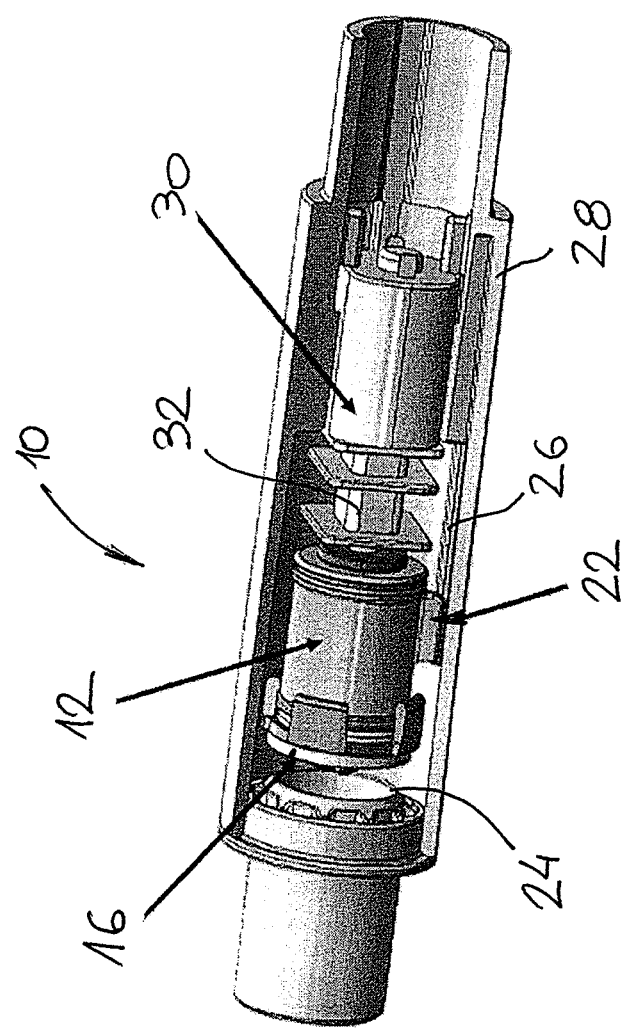
Figure 5:
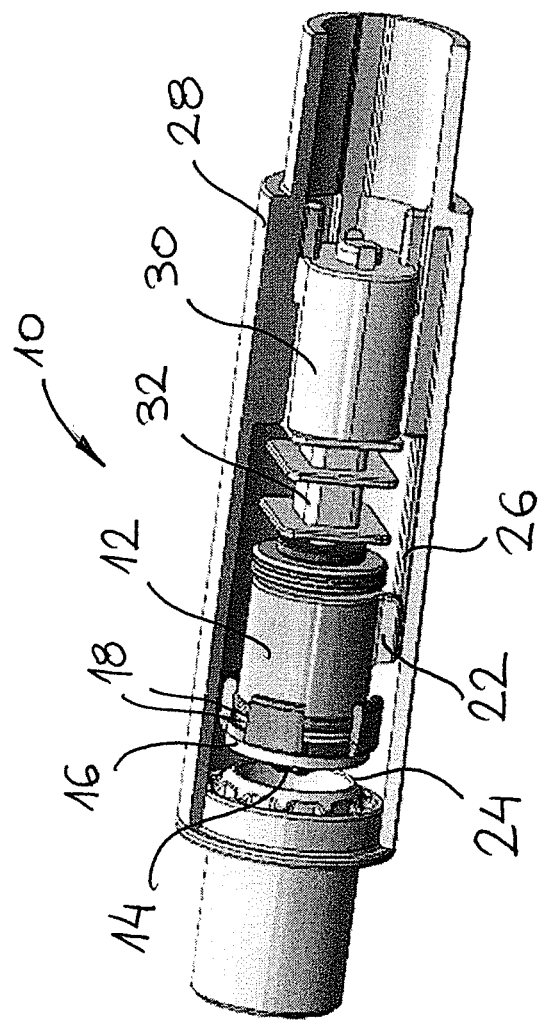
Figure 6:
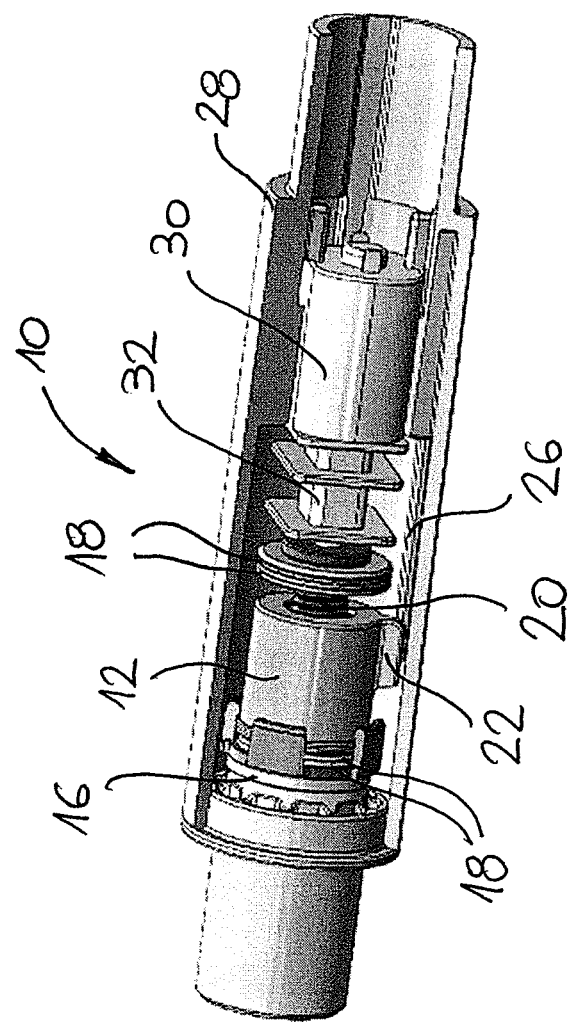
Figure 7:
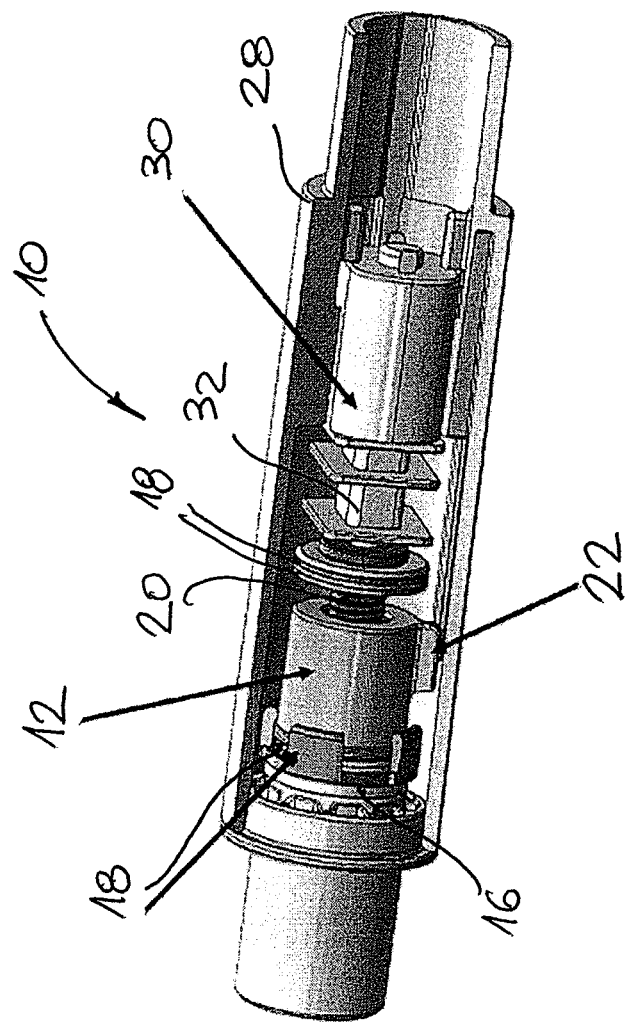
Figure 14:
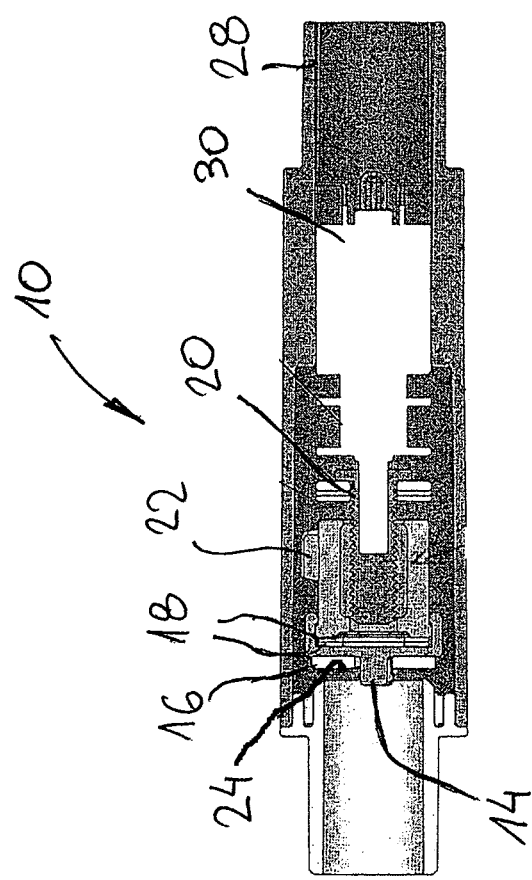
FIG. 14 is a longitudinal cross-sectional view of the valve of FIG. 1 in a closed position.

Reiterating, with reference to individual figures, FIG. 2 shows valve 10 at an initial stage of closing wherein nut 12 starts to rotate and projection 22 disengages from limiter 26. FIG. 3 shows a further stage of opening-rotation of nut 12 and projection 22; FIG. 4 shows valve 10 when projection 22 reaches limiter 26, during a further closing process stage and FIG. 5 shows the valve during axial movement in the closing direction. FIG. 6 shows a valve closing stage where seal 16 has reached lip 24; and FIG. 7 shows the valve in the closed position, with seal 16 pressed against lip 24. FIG. 14 shows valve 10 in the closed position.

Figure 8:
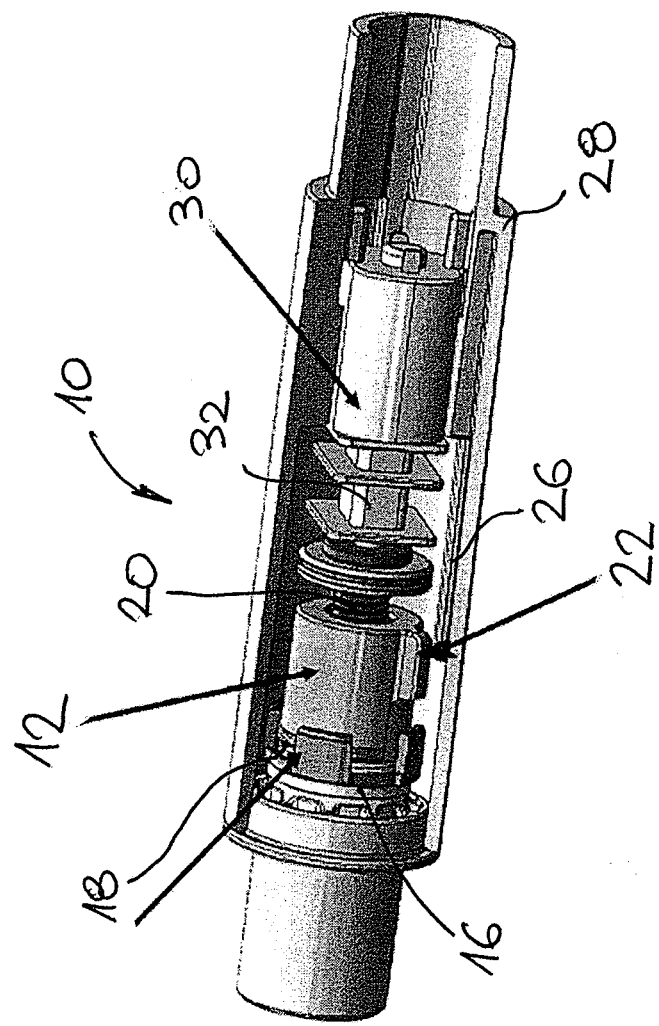
FIGS. 8-13 are perspective views of the valve of FIG. 1 showing the valve in various stages of opening.
Figure 9:
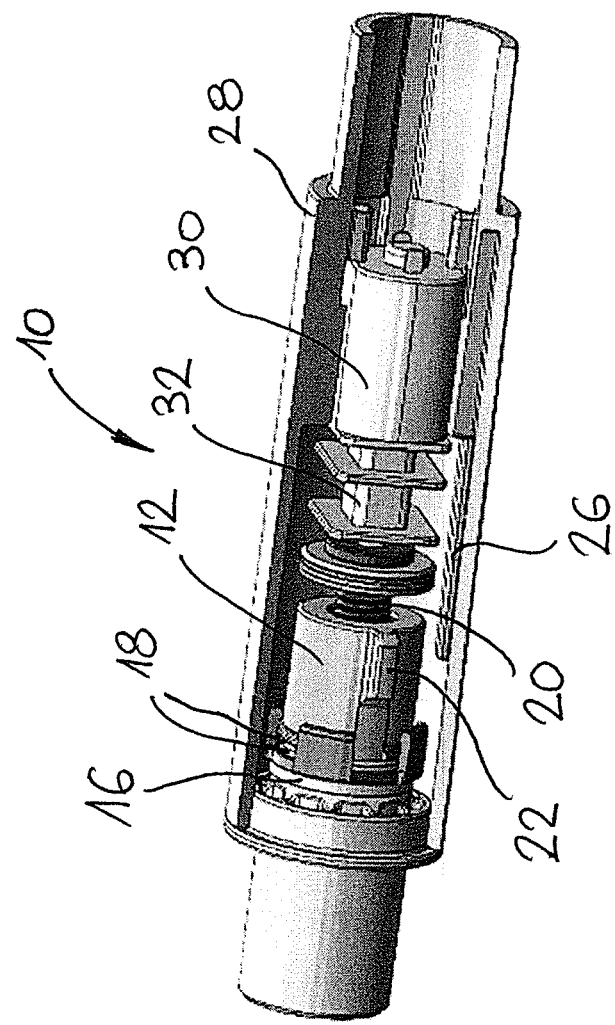
Figure 10:
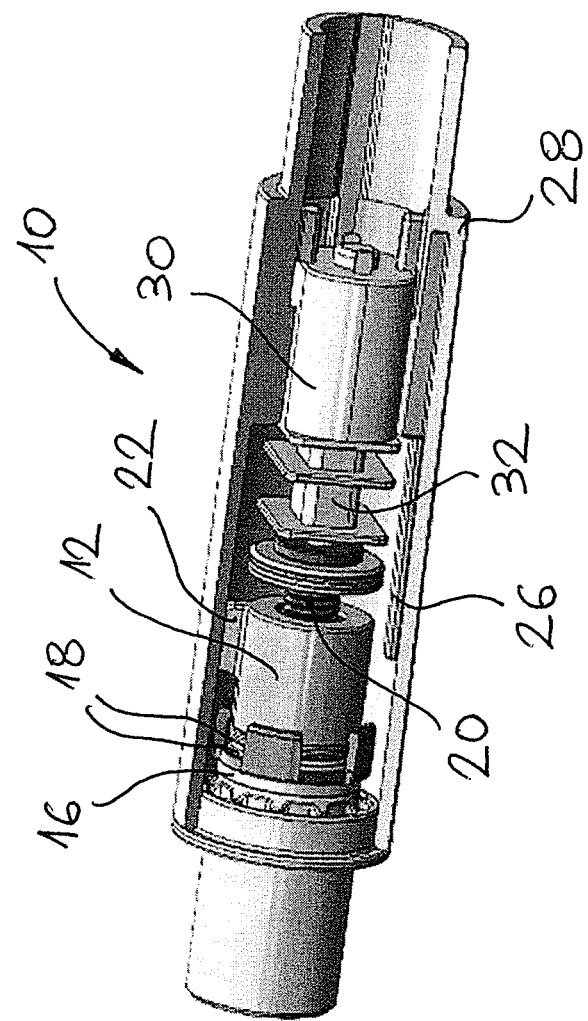
Figure 11:
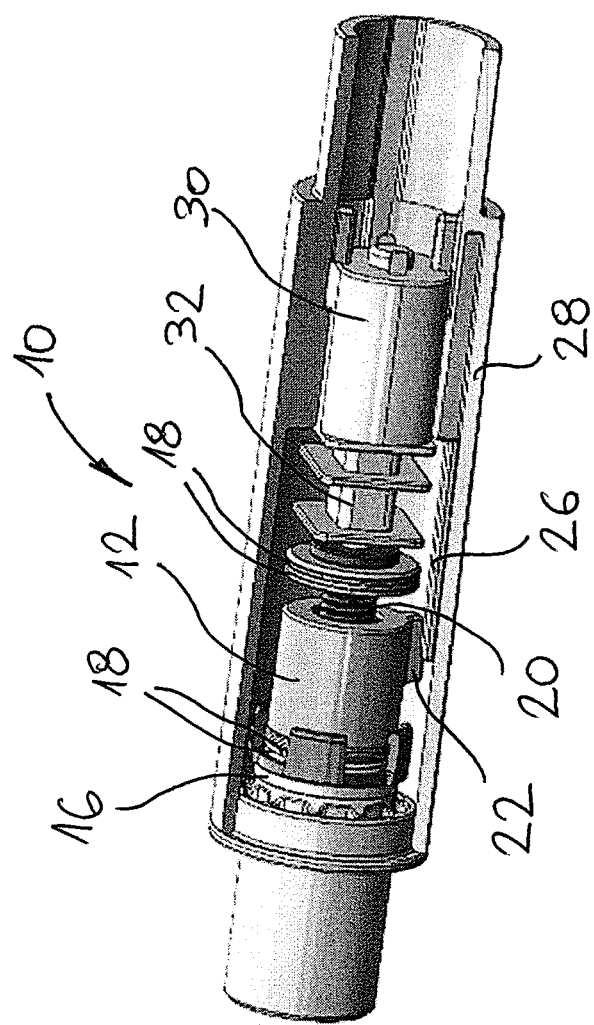
Figure 12:
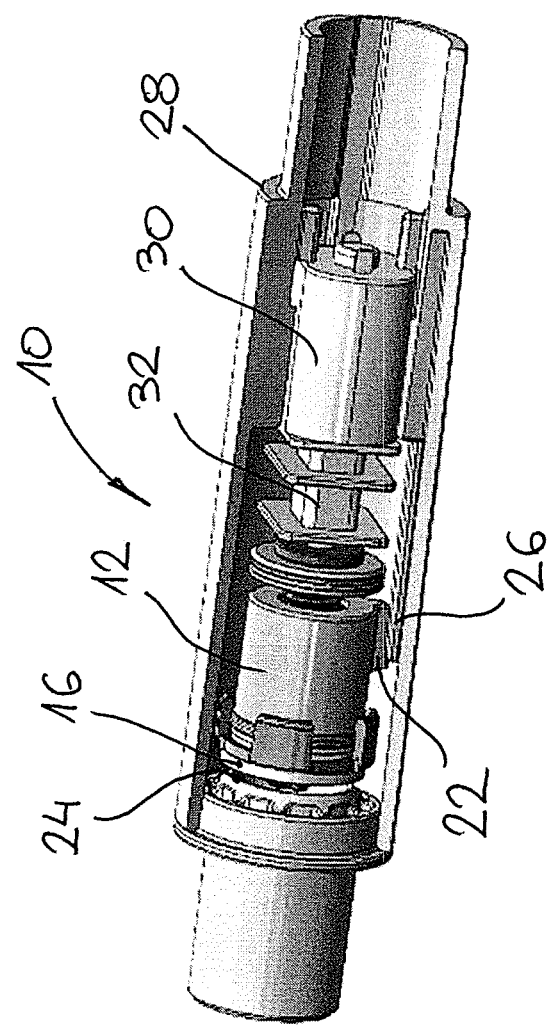
Figure 13:
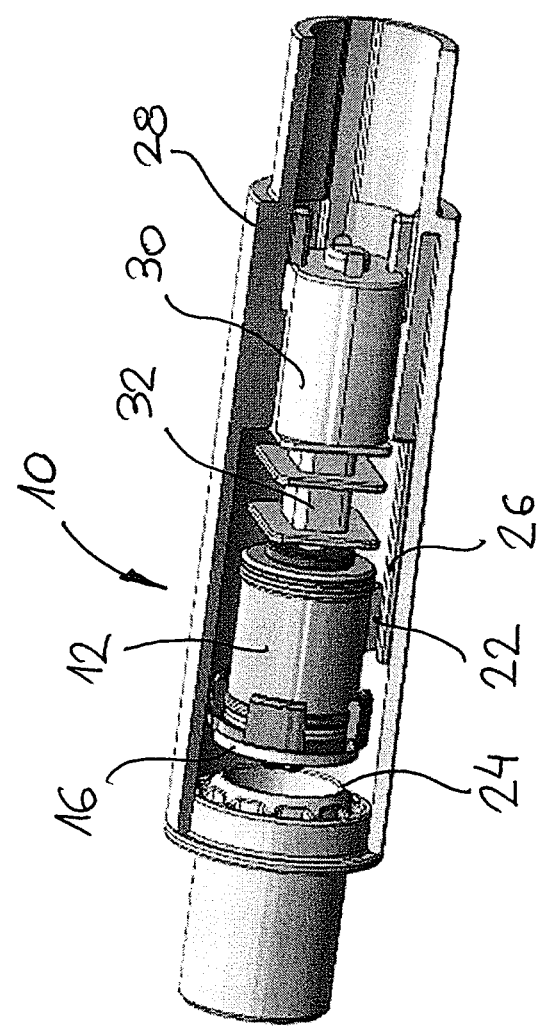

FIG. 8 shows valve 10 when initially starting to open wherein projection 22 is disconnecting from limiter 26. FIG. 9 shows further rotation of nut 12 during the opening process; and FIG. 10 shows even further rotation of nut 12. FIG. 11 illustrates when projection 22 reaches limiter 26. FIG. 12 shows the beginning axial movement during the opening process of the valve; and FIG. 13 shows the fully opened state, wherein nut 12 has reached its rearmost position. Although the present invention has been described to a certain degree of particularity, it should be understood that various alterations and modifications could be made without departing from the scope of the invention as hereinafter claimed.

The invention claimed is:

1. An electric valve comprising:
a valve body, the valve body housing:
   a nut having a central shaft;
   a screw threadingly engaged within said nut the screw having a screw axis that moves the nut;
   a seal mounted to said central shaft and configured to move freely with respect to the central shaft, both axially and rotatably there-about;
   sliding bearings disposed between said nut and said seal and disposed between said nut and a base of said screw;
   a lip correspondingly disposed with respect to said seal and reversibly engagable therewith;
   at least one projection attached at a periphery of said nut; and
   a limiter positioned in an inner side of said valve body and configured so that said at least one projection is abuttable therewith,
   wherein during rotation of the screw, when the at least one projection is spaced from the limiter, the screw is fixed to the nut to prevent the nut from turning around the screw such that the nut moves together with the screw, and when the at least one projection abuts the limiter, the nut cannot continue to turn and the screw moves the nut in an axial direction,
whereby, due to the slide bearings, neither upon opening of the valve or closing of the valve does the seal slide on the lip.

2. The valve of claim 1, wherein said at least one projection abuts against said limiter.

3. The valve of claim 1, wherein said sliding bearings comprise two or more rings made of or coated with a low friction material.

4. The valve of claim 1, wherein said sliding bearings are configured to freely move axially and rotate with respect to the central shaft.

5. The valve of claim 1, wherein when the valve is at the end of the opening process, a rear portion of the nut slides against sliding bearings.

6. The valve of claim 1, wherein when the valve is at the end of the opening process, a forward portion of the screw interfaces against an inward portion of the nut.

7. The valve of claim 6, wherein the screw interfaces against the inward portion of the nut occurs with negligible friction.

8. The valve of claim 1, wherein when the valve is at the end of the closing process, the seal moves axially against the lip without relative movement therebetween.

9. The valve of claim 1, wherein when the valve is at the end of the closing process, the nut axially presses on seal through sliding bearings, whereby the seal presses against the lip.

* * * * *